(12) United States Patent
Mizuno

(10) Patent No.: US 8,216,734 B2
(45) Date of Patent: Jul. 10, 2012

(54) FUEL CELL SYSTEM

(75) Inventor: Hideaki Mizuno, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 74 days.

(21) Appl. No.: 12/864,429

(22) PCT Filed: Jan. 15, 2009

(86) PCT No.: PCT/JP2009/050442
§ 371 (c)(1),
(2), (4) Date: Jul. 23, 2010

(87) PCT Pub. No.: WO2009/096229
PCT Pub. Date: Aug. 6, 2009

(65) Prior Publication Data
US 2011/0003221 A1    Jan. 6, 2011

(30) Foreign Application Priority Data

Jan. 28, 2008    (JP) .................................. 2008-016423

(51) Int. Cl.
*H01M 8/04* (2006.01)
(52) U.S. Cl. .................. 429/432; 429/429; 429/430
(58) Field of Classification Search .................. 429/428
See application file for complete search history.

(56) References Cited

U.S. PATENT DOCUMENTS

2004/0214055 A1 * 10/2004 Aoyama et al. ................. 429/19
2007/0048566 A1   3/2007 Nakamura et al.

FOREIGN PATENT DOCUMENTS

| DE | 11 2006 003 141 T5 | 10/2008 |
|---|---|---|
| JP | 2003-504807 A1 | 2/2003 |
| JP | 2003-197210 A1 | 7/2003 |
| JP | 2003-272686 A1 | 9/2003 |
| JP | 2004-349050 A1 | 12/2004 |
| JP | 2005-243567 A1 | 9/2005 |
| JP | 2005243567 * | 9/2005 |
| JP | 2006-040598 A1 | 2/2006 |
| WO | 2007/063783 A1 | 6/2007 |

OTHER PUBLICATIONS

Office Action issued Feb. 7, 2011 in Japanese Application No. 2008-016423 and English translation thereof.

* cited by examiner

*Primary Examiner* — Ula C Ruddock
*Assistant Examiner* — Patricia Davis
(74) *Attorney, Agent, or Firm* — Kenyon & Kenyon LLP

(57) ABSTRACT

Provided is a fuel cell system which can properly control a refresh operation. A controller controls the refresh operation so that an output voltage does not exceed an avoidance voltage even after the refresh operation. Specifically, the controller estimates the output voltage after the refresh operation from the output voltage before the refresh operation and controls execution of the refresh operation so that the estimated output voltage after the refresh operation does not exceed the avoidance voltage. For example, if before the refresh operation, when judging that the estimated output voltage after the refresh operation does not exceed the avoidance voltage, the controller executes the refresh operation.

3 Claims, 3 Drawing Sheets

FUEL CELL SYSTEM

This is a 371 national phase application of PCT/JP2009/050442 filed 15 Jan. 2009, which claims priority to Japanese Patent Application No. 2008-016423 filed 28 Jan. 2008, the contents of which are incorporated herein by reference.

TECHNICAL FIELD

The present invention relates to a fuel cell system, and more particularly, it relates to a fuel cell system which controls an output power in accordance with the operation state of a fuel cell.

BACKGROUND ART

Presently, the future of motorized society depending on petroleum has been feared, and hence there is expected the spread of a car on which a fuel cell using hydrogen as a fuel is mounted. The fuel cell has a stack structure where cells are stacked in series, and generates a power by use of an electrochemical reaction between a fuel gas containing hydrogen supplied to an anode and an oxidizing gas containing oxygen supplied to a cathode.

In the fuel cell, various restrictions exist during startup as compared with another power source. The power generation efficiency of such a fuel cell deteriorates owing to the drop of temperature and the poisoning of an electrode catalyst, with the result that a desired voltage/current cannot be supplied, and hence an apparatus cannot be started sometimes.

In view of such a situation, at the start of the fuel cell, an operation of recovering the current/voltage characteristics (IV characteristics) of the fuel cell (hereinafter referred to as a refresh operation) is performed by causing the short state of at least one of the fuel gas supplied to the anode and the oxidizing gas supplied to the cathode, so that the overvoltage of a part of an electrode is increased, thereby further generating heat, raising the temperature of the fuel cell, and reducing the electrode catalyst (see, e.g., Patent Document 1).

[Patent Document 1] Japanese Patent Application Laid-Open No. 2003-504807: Translation version

DISCLOSURE OF THE INVENTION

Problem to be Solved by the Invention

The current/voltage characteristics (hereinafter referred to as the IV characteristics) of a fuel cell are not fixed, and noticeably fluctuate before and after a refresh operation as follows. Specifically, when the refresh operation is once executed, the IV characteristics of the fuel cell improve. However, when the refresh operation is much frequently executed, the IV characteristics of the fuel cell improve more than necessary, whereby there is feared a problem that a surplus power generated by the power generation of the fuel cell cannot be absorbed by a secondary cell or the like.

The present invention has been developed in view of the above-mentioned situation, and an object thereof is to provide a fuel cell system which can properly control a refresh operation.

Means for Solving the Problem

To achieve the above object, a fuel cell system according to the present invention is characterized by comprising: a fuel cell; operation means for executing a refresh operation to improve electric characteristics of the fuel cell; and operation control means for controlling the execution of the refresh operation by the operation means so that an output voltage of the fuel cell after the refresh operation does not exceed a set output voltage upper limit value.

According to such a constitution, the execution of the refresh operation is controlled so that the output voltage of the fuel cell after the refresh operation does not exceed the set output voltage upper limit value, whereby it is possible to beforehand prevent the operation from being executed in a state where the output voltage of the fuel cell exceeds the set output voltage upper limit value, and accordingly, it is possible to lengthen the life of the fuel cell.

Moreover, in the above constitution, a preferable configuration is that the operation control means estimates the output voltage of the fuel cell after the refresh operation from the output voltage of the fuel cell before the refresh operation, and allows the execution of the refresh operation by the operation means, when judging that the estimated output voltage after the refresh operation does not exceed the output voltage upper limit value.

Furthermore, another fuel cell system according to the present invention is characterized by comprising: a fuel cell; an accumulator connected to the fuel cell via a discharge path thereof; operation means for executing a refresh operation to improve electric characteristics of the fuel cell; setting means for setting a power upper limit value of the fuel cell in consideration of an allowable power of the accumulator; and operation control means for controlling the execution of the refresh operation by the operation means so that an output power of the fuel cell after the refresh operation does not exceed a set power upper limit value.

Here, in the above constitution, a preferable configuration is that the fuel cell system further comprises detection means for detecting a state of charge of the accumulator, wherein the setting means grasps the allowable power of the accumulator from the state of charge of the accumulator detected by the detection means, and sets the power upper limit value of the fuel cell in consideration of the grasped allowable power.

Effect of the Invention

As described above, according to the present invention, a refresh operation can properly be controlled.

BEST MODE FOR CARRYING OUT THE INVENTION

Hereinafter, an embodiment according to the present invention will be described with reference to drawings.

A. Present Embodiment

FIG. 1 shows a schematic constitution of a vehicle in which a fuel cell system 10 according to the present embodiment is mounted. It is to be noted that in the following description, a fuel cell hybrid vehicle (FCHV) is presumed as one example of the vehicle, but the present invention is applicable to an electric car or a hybrid car. Moreover, the present invention is applicable not only to the vehicle but also to various mobile bodies (e.g., a ship, an airplane, a robot, etc.), a stational power source and a portable fuel cell system.

The fuel cell system 10 functions as a car-mounted power source system mounted in a fuel cell vehicle, and comprises a fuel cell stack 20 which receives supply of a reactant gas (a fuel gas, an oxidizing gas) to generate a power; an oxidizing gas supply system 30 which supplies air as the oxidizing gas to the fuel cell stack 20; a fuel gas supply system 40 which supplies a hydrogen gas as the fuel gas to the fuel cell stack 20; a power system 50 which controls charging/discharging of the power; a cooling system 60 which cools the fuel cell stack 20; and a controller (ECU) 70 which controls the whole system.

The fuel cell stack 20 is a solid polymer electrolyte type cell stack in which a plurality of cells are stacked in series. In the fuel cell stack 20, an oxidizing reaction of formula (1) occurs in an anode, and a reducing reaction of formula (2) occurs in a cathode. An electromotive reaction of formula (3) occurs in the whole fuel cell stack 20.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H2O \quad (3)$$

A voltage sensor 71 for detecting the output voltage of the fuel cell stack 20 and a current sensor 72 for detecting a power generation current are attached to the fuel cell stack 20.

The oxidizing gas supply system 30 comprises an oxidizing gas flow path 34 through which an oxidizing gas to be supplied to the cathode of the fuel cell stack 20 flows and an oxidizing off-gas flow path 36 through which an oxidizing off-gas discharged from the fuel cell stack 20 flows. The oxidizing gas flow path 34 is provided with an air compressor 32 which takes in the oxidizing gas from the atmosphere via a filter 31; a humidifier 33 which humidifies the oxidizing gas to be supplied to the cathode of the fuel cell stack 20; and a throttle valve 35 which regulates the amount of the oxidizing gas to be supplied. The oxidizing off-gas flow path 36 is provided with a back-pressure regulator 37 which regulates the supply pressure of the oxidizing gas, and the humidifier 33 which exchanges water between the oxidizing gas (dry gas) and the oxidizing off-gas (wet gas).

The fuel gas supply system 40 comprises a fuel gas supply source 41; a fuel gas flow path 45 through which the fuel gas to be supplied from the fuel gas supply source 41 to the anode of the fuel cell stack 20 flows; a circulation flow path 46 which returns a fuel off-gas discharged from the fuel cell stack 20 to the fuel gas flow path 45; a circulation pump 47 which supplies, under pressure, the fuel off-gas from the circulation flow path 46 to the fuel gas flow path 43; and a gas/water discharge flow path 48 branched and connected to the circulation flow path 47.

The fuel gas supply source 41 is constituted of, for example, a high pressure hydrogen tank, a hydrogen storing alloy or the like, and stores the hydrogen gas having a high pressure (e.g., from 35 MPa to 70 MPa). When a shutoff valve 42 is opened, the fuel gas flows out of the fuel gas supply source 41 to the fuel gas flow path 45. The pressure of the fuel gas is decreased to, for example, about 200 kPa by a regulator 43 or an injector 44, and the gas is supplied to the fuel cell stack 20.

It is to be noted that the fuel gas supply source 41 may be constituted of a reformer which forms a hydrogen-rich reforming gas from a hydrocarbon based fuel, and a high pressure gas tank which brings the reforming gas formed by this reformer into a high pressure state to store the pressure.

The regulator 43 is a device which regulates an upstream pressure (a primary pressure) thereof to a preset secondary pressure, and is constituted of, for example, a mechanical pressure reduction valve which decreases the primary pressure and the like. The mechanical pressure reduction valve includes a housing in which a back pressure chamber and a pressure regulation chamber are formed with a diaphragm therebetween, and has a constitution in which the primary pressure is decreased to a predetermined pressure in the pressure regulation chamber by the back pressure of the back pressure chamber to obtain the secondary pressure.

The injector 44 is an electromagnetic driving type on-off valve in which a valve body can directly be driven by an electromagnetic driving force in a predetermined drive cycle to be detached from a valve seat, thereby regulating a gas flow rate and a gas pressure. The injector 44 comprises a valve seat including a jet hole which jets a gas fuel such as the fuel gas, and further comprises a nozzle body which supplies and guides the gas fuel to the jet hole and a valve body movably included and held along an axial direction (a gas flow direction) with respect to this nozzle body to open and close the jet hole.

The gas/water discharge flow path 48 is provided with a gas/water discharge valve 49. The gas/water discharge valve 49 operates by a command from the controller 70 to discharge the fuel off-gas including impurities and the water to the outside of the circulation flow path 46. When the gas/water discharge valve 49 is opened, the concentration of the impurities of the fuel off-gas in the circulation flow path 46 decreases, and the concentration of hydrogen in the fuel off-gas circulating through a circulation system can be increased.

The fuel off-gas discharged via the gas/water discharge valve 49 is mixed with the oxidizing off-gas flowing through the oxidizing off-gas flow path 34, and is diluted by a diluter (not shown). The circulation pump 47 is driven by a motor to circulate and supply the fuel off-gas from the circulation system to the fuel cell stack 20.

The power system 50 comprises a DC/DC converter 51, a battery 52, a traction inverter 53, a traction motor 54 and auxiliary machines 55. The DC/DC converter 51 has a function of raising a direct-current voltage supplied from the battery 52 to output the voltage to the traction inverter 53, and a function of lowering the pressure of a direct-current power generated by the fuel cell stack 20 or a regenerative power collected by the traction motor 54 by regenerative braking to charge the battery 52. By these functions of the DC/DC converter 51, the charging/discharging of the battery 52 is controlled. Moreover, by the voltage conversion control of the DC/DC converter 51, the operation point (the output voltage, the output current) of the fuel cell stack 20 is controlled.

The battery (an accumulator) 52 functions as a storage source of a surplus power, a regenerative energy storage source during the regenerative braking, or an energy buffer during load fluctuation accompanying the acceleration or deceleration of the fuel cell vehicle. As the battery 52, for example, a nickel/cadmium accumulator battery, a nickel/hydrogen accumulator battery, or a secondary battery such as a lithium secondary battery is suitable.

The traction inverter 53 is, for example, a PWM inverter driven by a pulse width modulation system, and converts a direct-current voltage output from the fuel cell stack 20 or the battery 52 into three-phase alternate-current voltages in accordance with the control command from the controller 70 to control the rotation torque of the traction motor 54. The traction motor 54 is a motor (e.g., a three-phase alternate-current motor) which drives wheels 56L and 56R, and constitutes a power source of the fuel cell vehicle.

The auxiliary machines 55 generically include motors arranged in units of the fuel cell system 10 (e.g., power sources for pumps, etc.), inverters for driving these motors, and various car-mounted auxiliary machines (e.g., the air compressor, the injector, a cooling water circulation pump, a radiator, etc.).

The cooling system 60 comprises refrigerant paths 61, 62, 63 and 64 which supplies a refrigerant circulating through the fuel cell stack 20; a circulation pump 65 for supplying the refrigerant under pressure; a radiator 66 for heat exchange between the refrigerant and outside air; a three-way valve 67 for switching the circulation paths of the refrigerant; and a temperature sensor 74 for detecting a refrigerant temperature. The three-way valve 67 is controlled to open and close so that during a usual operation after the completion of a warm-up operation, the refrigerant flowing out of the fuel cell stack 20 flows through the flow paths 61 and 64, is cooled by the radiator 66 and then flows through the refrigerant path 63 to flow into the fuel cell stack 20 again. Moreover, the three-way valve 67 is controlled to open and close so that during the warm-up operation immediately after system start, the refrigerant flowing out of the fuel cell stack 20 flows through the refrigerant paths 61, 62 and 63 to flow into the fuel cell stack 20 again.

The controller 70 is a computer system comprising a CPU, an ROM, an RAM, an input/output interface and the like, and functions as control means for controlling the units of the fuel cell system 10 (the oxidizing gas supply system 30, the fuel gas supply system 40, the power system 50 and the cooling system 60). For example, the controller 70 starts the operation of the fuel cell system 10 upon receiving a start signal IG output from an ignition switch, and obtains the required power of the whole system based on an accelerator pedal open degree signal ACC output from an accelerator pedal sensor, a vehicle speed signal VC output from a vehicle speed sensor and the like.

The required power of the whole system is a total value of a vehicle running power and an auxiliary machine power. The auxiliary machine power includes power consumed by car-mounted auxiliary machines (the humidifier, air compressor, hydrogen pump, cooling water circulation pump, etc.), power consumed by devices necessary for the vehicle running (a transmission, wheel control device, steering device, suspension device, etc.), power consumed by devices arranged in a passenger space (an air conditioner, light fixture, audio, etc.) and the like.

Moreover, the controller 70 determines the distribution of the output powers of the fuel cell stack 20 and the battery 52 to calculate a power generation command value, and controls the oxidizing gas supply system 30 and the fuel gas supply system 40 so that the amount of the power to be generated by the fuel cell stack 20 matches a target power (the required power). Furthermore, the controller 70 controls the DC/DC converter 51 to regulate the output voltage of the fuel cell stack 20, thereby controlling the operation point (the output voltage, the output current) of the fuel cell stack 20. The controller 70 outputs, for example, alternate-current voltage command values of U, V and W-phases as switching commands to the traction inverter 53 so as to obtain a target vehicle speed in accordance with the accelerator pedal open degree, thereby controlling the output torque and rotation number of the traction motor 54.

Moreover, in the present embodiment, a refresh operation is executed by a low efficiency operation at a predetermined timing under the control of the controller 70. Here, in the low efficiency operation, the amount of air to be supplied is decreased as compared with that in the usual operation (e.g., an air stoichiometric ratio is set around 1.0), thereby increasing a power generation loss to execute the operation at a low power generation efficiency.

In this way, the controller (operation means) 70 can recover the IV characteristics (electric characteristics) of the fuel cell stack 20 by increasing the overvoltage of a part of the electrode, to further generate heat, raise the temperature of the fuel cell and reduce the electrode catalyst (i.e., by executing the refresh operation). However, when such a refresh operation is much frequently executed, the IV characteristics of the fuel cell improve more than necessary, thereby causing a problem that a surplus power generated by the power generation of the fuel cell cannot be absorbed by a secondary cell or the like (see the paragraphs of the problem to be solved by the invention). Such a problem will be described with reference to FIG. 2.

FIG. 2 is a diagram showing the IV characteristics of the fuel cell stack 20 before and after the refresh operation. The IV characteristics before the refresh operation are shown by a solid line, and the IV characteristics after the refresh operation are shown by a one-dot chain line. It is to be noted that a target OC avoidance voltage Var of FIG. 2 is a threshold value (e.g., about 0.85/cell) of an upper limit voltage of the fuel cell stack 20, and is preset during product shipment or the like.

<State before Refresh Operation>

Before the refresh operation, the controller 70 determines the distribution of the output powers of the fuel cell stack 20 and the battery 52, and controls the supply of the oxidizing gas and the fuel gas so that the amount of the power to be generated by the fuel cell stack 20 matches the target power. Furthermore, the controller 70 controls the DC/DC converter 51 to regulate the output voltage of the fuel cell stack 20. In consequence, the operation point (the output current, the output voltage) is positioned on an IV characteristic curve C1 (see the solid line shown in FIG. 2).

<State after Refresh Operation>

On the other hand, when the refresh operation ends, the IV characteristics of the fuel cell stack 20 improve, and the IV characteristic curve shifts from the IV characteristic curve C1 shown by the solid line of FIG. 2 to an IV characteristic curve C2. With the shift of the IV characteristic curve, even if the controller 70 controls the DC/DC converter 51 so as to obtain the same output current before and after the refresh operation, the obtained output voltage rises. In consequence, for example, a problem occurs that although the output voltage is set to the OC avoidance voltage Var or less before the refresh operation (see an operation point (I1, V1) shown in FIG. 2), the output voltage exceeds the OC avoidance voltage Var after the refresh operation (see an operation point (I2, V2) shown in FIG. 2).

To solve the problem, in the present embodiment, the controller (operation control means) 70 controls the execution of the refresh operation so that the output voltage does not exceed the OC avoidance voltage Var even after the refresh operation. Specifically, the controller (the operation control means) 70 estimates the output voltage after the refresh operation from the output voltage before the refresh operation, and controls the execution of the refresh operation so that the estimated output voltage after the refresh operation does not exceed the OC avoidance voltage (an output voltage upper limit value) Var. For example, before the refresh operation, the controller 70 estimates the output voltage after the refresh operation as described above, and judges whether or not the estimated output voltage exceeds the OC avoidance voltage Var. Subsequently, when judging that the estimated output voltage does not exceed the OC avoidance voltage Var, the controller (the operation control means and the operation means) 70 executes the refresh operation.

Needless to say, a method of controlling the execution of the refresh operation is not limited to the above method. For example, the controller (the operation control means) 70 obtains a difference $\Delta V$ between the output voltage before the refresh operation and the OC avoidance voltage Var, and may execute the refresh operation, only when the obtained difference $\Delta V$ is not less than the threshold value of the voltage. It is to be noted that the threshold voltage value may beforehand be obtained by an experiment or the like.

Here, FIG. 3 is a diagram illustrating a relation between the IV characteristics and IP characteristics (output current/output power characteristics) of the fuel cell stack 20 before and after the refresh operation. The IV characteristics and IP characteristics before the refresh operation are shown by solid lines, and the IV characteristics and IP characteristics after the refresh operation are shown by one-dot chain lines. It is to be noted that a threshold power value Par shown in FIG. 4 is the upper limit value of the output power of the fuel cell stack 20 set in consideration of the allowable power of the battery 52. Moreover, the target OC avoidance voltage Var shown in FIG. 3 shows the threshold value of the upper limit voltage of the fuel cell stack 20 in the same manner as in FIG. 2.

As shown in FIG. 3, the refresh operation is executed to also improve the IP characteristics (electric characteristics) of the fuel cell stack 20, and an IP characteristic curve shifts from an IP characteristic curve C3 to an IP characteristic curve C4. Here, when operation points below the target OC avoidance voltage Var before and after the refresh operation are compared, an output power P02 at an operation point (I2, V2) after the refresh operation is larger than an output power P01 at an operation point (I1, V1) before the refresh operation.

Here, to prevent the overcharge of the battery (the accumulator) 52, the output power of the fuel cell stack 20 needs to be suppressed to be less than the threshold power value Par. When the IP characteristics are improved by the refresh operation, as shown in FIG. 3, the output power P02 after the refresh operation exceeds the threshold power value Par sometimes.

Therefore, in the present embodiment, the controller (the operation control means) 70 controls the refresh operation of the fuel cell stack 20 so that the output power does not exceed the threshold power value Par. Specifically, the controller 70 determines the start timing and stop timing of the refresh operation so that the output power of the fuel cell stack 20 does not exceed the threshold power value Par. Furthermore, the controller 70 estimates the IP characteristics after the refresh operation, and obtains the estimated value of the output power from the estimated IP characteristics to judge whether or not the refresh operation can be executed, before the refresh operation. Moreover, the controller 70 executes the refresh operation when the estimated value of the output power is less than the threshold power value Par, whereas the controller prohibits the refresh operation when the estimated value of the output power is not less than the threshold power value Par. In consequence, it is possible to beforehand prevent a problem that the output power of the fuel cell stack 20 is excessively large and that accordingly, a surplus power cannot be absorbed by the battery 52 (i.e., the battery 52 is overcharged). It is to be noted that the controller 70 may judge whether or not the refresh operation can be executed based on, for example, a running time, a running distance, the temperature of the fuel cell and the like at a predetermined timing.

Here, the setting method of the threshold power value Par will be described. As is well known, the allowable power of the battery 52 (i.e., the amount of the power which can be charged into the battery 52) varies in accordance with the required power of the system, the power output from the battery 52 and the like every moment. Therefore, in the present embodiment, the state of charge of the battery (the accumulator) 52 is detected by an SOC sensor (detection means) 52a, and the threshold power value Par is set or updated based on the detected result. This will be described in detail. The controller (setting means) 70 detects the state of charge of the battery 52 by the SOC sensor 52a, and sets or updates the threshold power value (a power upper limit value) Par based on the detected result. In other words, upon detecting the state of charge (SOC) of the battery 52 by the SOC sensor 52, the controller 70 obtains the allowable power of the battery 52 from the detected result. Subsequently, the controller (the setting means) 70 updates the threshold power value Par so that the surplus power is included in the allowable power of the battery (the accumulator) 52 while the power required from the system is satisfied.

As described above, according to the present embodiment, the controller 70 estimates the output voltage after the refresh operation from the output voltage before the refresh operation, and controls the execution of the refresh operation so that the estimated output voltage after the refresh operation does not exceed the OC avoidance voltage Var. In consequence, it is possible to beforehand prevent the operation from being executed in a state where the output voltage of the fuel cell stack 20 exceeds the OC avoidance voltage Var, and it is possible to lengthen the life of the fuel cell stack 20.

Furthermore, the controller 70 executes the refresh operation when the estimated value of the output power is less than the threshold power value Par, whereas the controller prohibits the refresh operation when the estimated value of the output power is not less than the threshold power value Par. In consequence, it is possible to beforehand prevent a problem that the output power of the fuel cell stack 20 is excessively large and that accordingly, the battery 52 cannot absorb the surplus power (i.e., the battery 52 is overcharged).

B. Modification (1) In the above embodiment, the operation conditions of the refresh operation are not especially described, but the operation conditions of the refresh operation may be changed in accordance with the set threshold power value Par, OC avoidance voltage Var or the like. Specifically, the controller 70 changes operation conditions such as a time interval for executing the refresh operation (e.g., every 30 seconds, every four minutes or the like) and the output voltage of the fuel cell stack 20 during the refresh operation (e.g., 0.3 V, 0.6 V or the like) in accordance with the set threshold power value Par, OC avoidance voltage Var or the like. Needless to say, it is possible to arbitrarily set conditions on which parameters concerning the refresh operation (the time interval, the output voltage, etc.) are changed.

(2) In the above embodiment, a case where the refresh operation is executed during the vehicle running has been described as an example, but the present invention is similarly applicable to a case where the refresh operation is executed at the start or stop of the system or during an intermittent operation thereof. Moreover, when the required system power becomes not more than a predetermined value (e.g., around idle output or the like), it may be judged whether or not the refresh operation can be executed.

(3) In the above embodiment, a case where the refresh operation is executed to recover the activity of the poisoned electrode catalyst has been described, but the present invention is applicable to any case as long as the warm-up operation is necessary, for example, a case where the warm-up operation is performed during low temperature start, a case where rapid warm-up is performed before the stop of the system operation or the like.

DESCRIPTION OF REFERENCE NUMERALS

Figure 1:
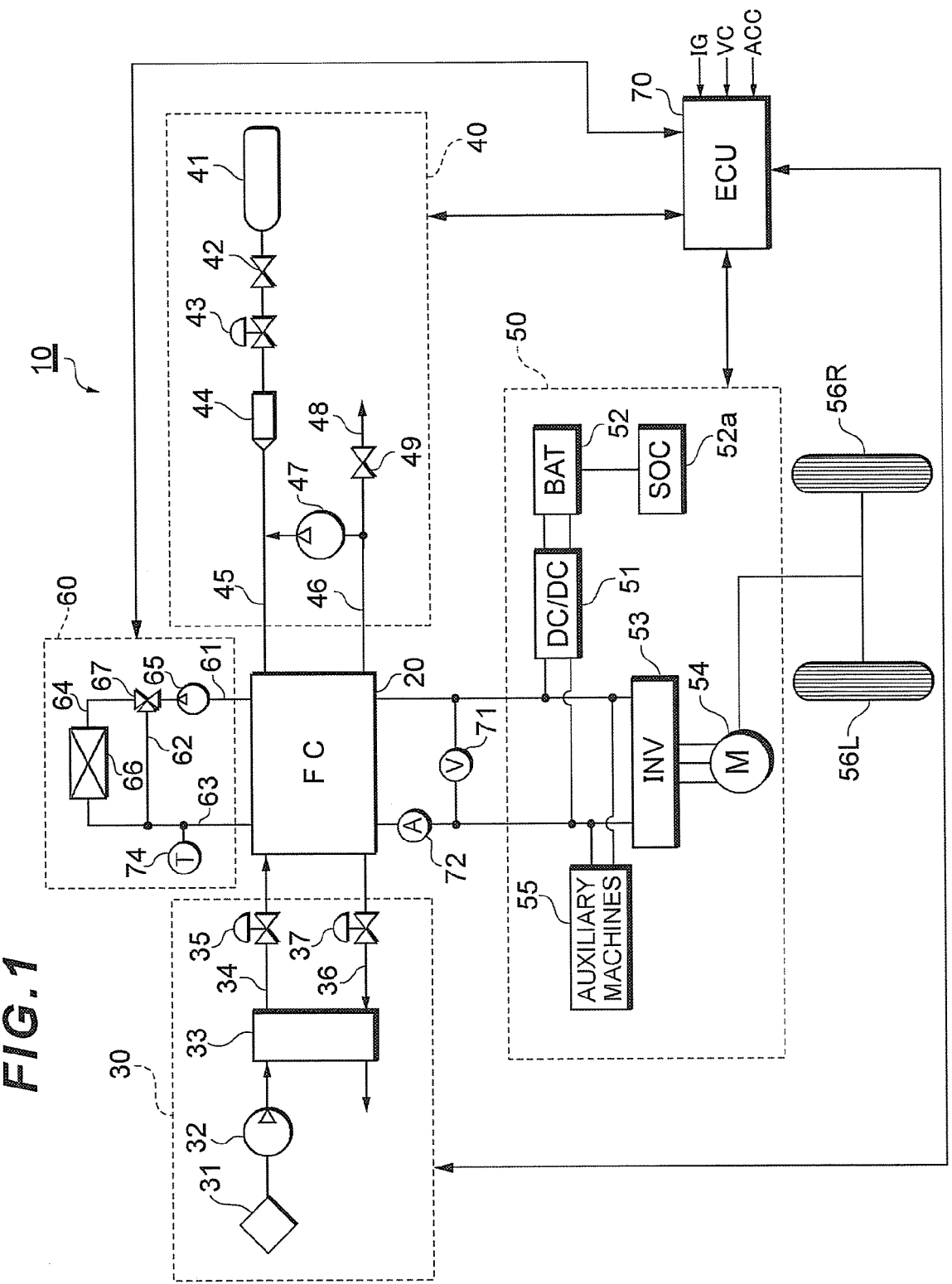
FIG. 1 is a diagram showing the constitution of the main part of a fuel cell system according to the present embodiment.
Figure 2:
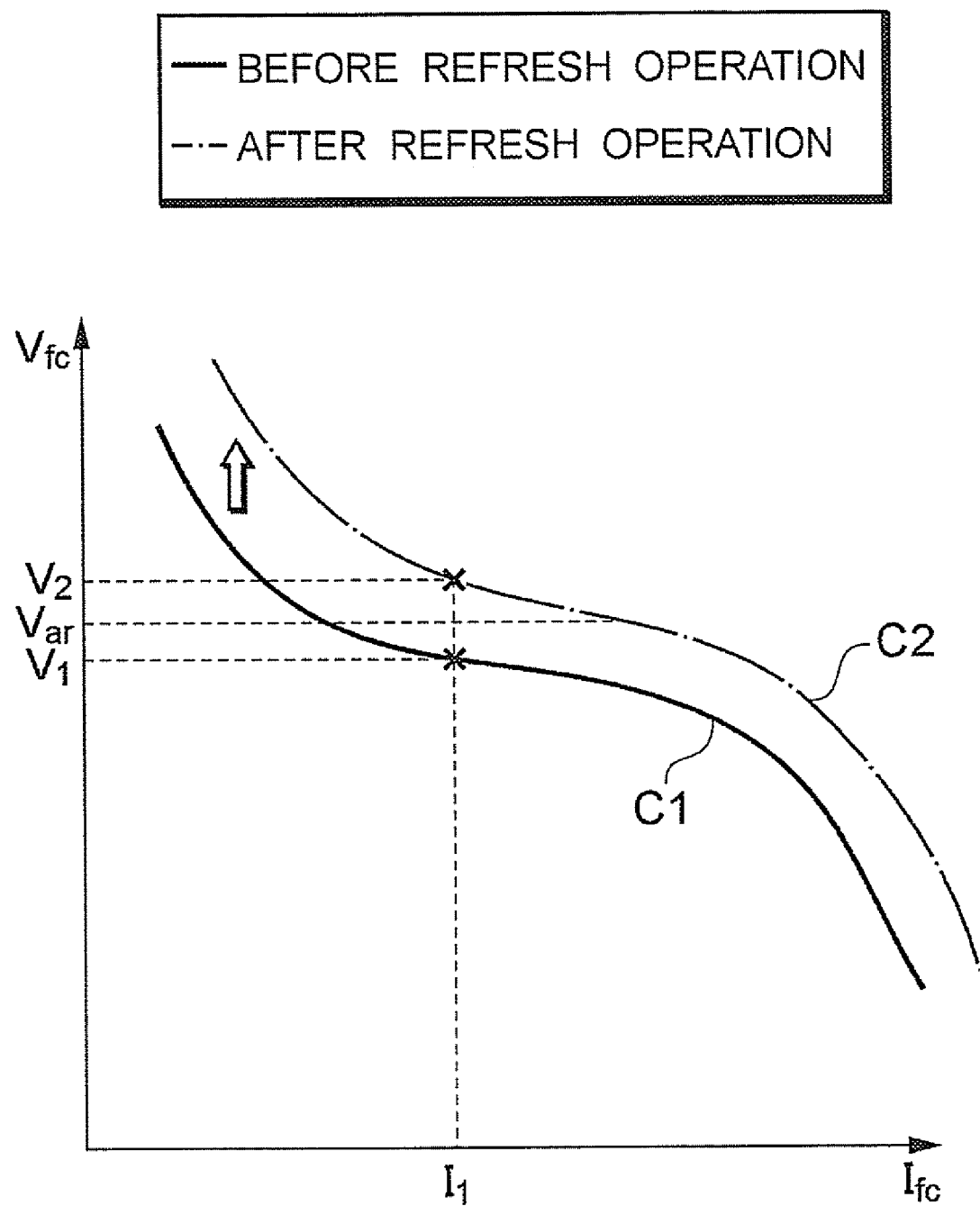
FIG. 2 is a diagram showing the IV characteristics of a fuel cell stack before and after a refresh operation.
Figure 3:
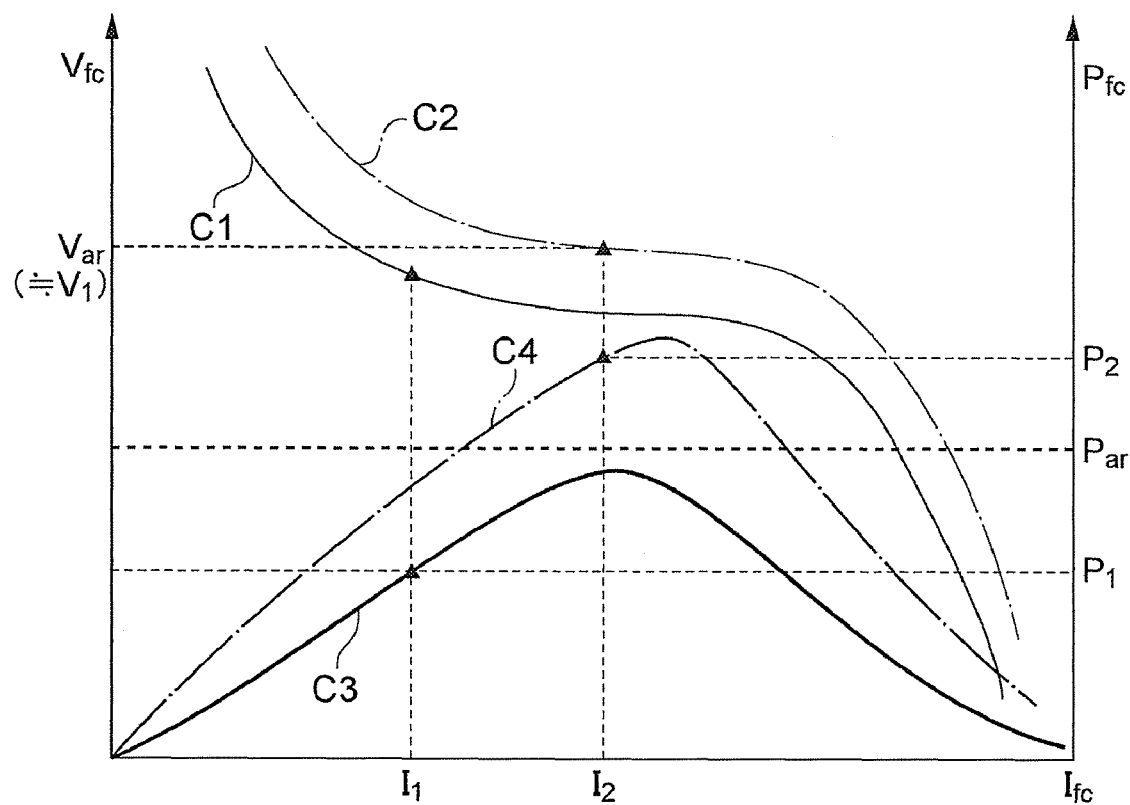
FIG. 3 is a diagram showing a relation between the IV characteristics and IP characteristics of the fuel cell stack before and after the refresh operation.

10 . . . fuel cell system, 20 . . . fuel cell stack, 30 . . . oxidizing gas supply system, 40 . . . fuel gas supply system, 50 . . . power system, 60 . . . cooling system, and 70 . . . controller.

The invention claimed is:

1. A fuel cell system comprising:
 a fuel cell;
 an operation device that executes a refresh operation to improve electric characteristics of the fuel cell; and
 an operation control device programmed to control the execution of the refresh operation by the operation device so that an output voltage of the fuel cell after the refresh operation does not exceed a set output voltage upper limit value,
 wherein the operation control device is programmed to estimate the output voltage of the fuel cell after the refresh operation from an output voltage of the fuel cell before the refresh operation, and to prohibit the execution of the refresh operation by the operation device, when judging that the estimated output voltage after the refresh operation exceeds the output voltage upper limit value.

2. A fuel cell system comprising:
 a fuel cell;
 an accumulator connected to the fuel cell via a discharge path thereof;
 an operation device that executes a refresh operation to improve electric characteristics of the fuel cell;
 a setting device that sets a power upper limit value of the fuel cell in consideration of an allowable power of the accumulator; and
 an operation control device programmed to control the execution of the refresh operation by the operation device so that an output power of the fuel cell after the refresh operation does not exceed a set power upper limit value,
 wherein the operation control device is programmed to estimate the output power of the fuel cell after the refresh operation from an output power of the fuel cell before the refresh operation, and to prohibit the execution of the refresh operation by the operation device, when judging that the estimated output power after the refresh operation exceeds the output power upper limit value.

3. The fuel cell system according to claim 2, further comprising:
 a detection device that detects a state of charge of the accumulator,
 wherein the setting device grasps the allowable power of the accumulator from the state of charge of the accumulator detected by the detection device and sets the power upper limit value of the fuel cell in consideration of the grasped allowable power.

* * * * *